US009908462B2

(12) United States Patent
Pickl

(10) Patent No.: US 9,908,462 B2
(45) Date of Patent: Mar. 6, 2018

(54) ILLUMINATION DEVICE FOR THE REAR LICENSE PLATE OF A MOTOR VEHICLE

(71) Applicant: Audi AG, Ingolstadt (DE)

(72) Inventor: Richard Pickl, Denkendorf (DE)

(73) Assignee: Audi AG, Ingolstadt (DE)

( * ) Notice: Subject to any disclaimer, the term of this patent is extended or adjusted under 35 U.S.C. 154(b) by 126 days.

(21) Appl. No.: 14/434,684

(22) PCT Filed: Oct. 9, 2013

(86) PCT No.: PCT/EP2013/003024
§ 371 (c)(1),
(2) Date: Apr. 9, 2015

(87) PCT Pub. No.: WO2014/056607
PCT Pub. Date: Apr. 17, 2014

(65) Prior Publication Data
US 2015/0232022 A1 Aug. 20, 2015

(30) Foreign Application Priority Data
Oct. 10, 2012 (DE) .................. 10 2012 019 847

(51) Int. Cl.
*B60Q 1/56* (2006.01)
*F21V 5/02* (2006.01)
(Continued)

(52) U.S. Cl.
CPC .............. *B60Q 1/56* (2013.01); *F21V 5/02* (2013.01); *B60R 13/105* (2013.01); *F21V 17/16* (2013.01)

(58) Field of Classification Search
CPC ......... B60Q 1/56; B60R 13/10; B60R 13/105; F21V 5/02; F21V 5/005; F21V 17/16; F21V 5/045005
See application file for complete search history.

(56) References Cited

U.S. PATENT DOCUMENTS 3,064,378 A * 11/1962 Onksen .................. B60Q 1/56
362/311.01
4,868,723 A * 9/1989 Kobayashi ............. B60Q 1/56
362/308
(Continued)

FOREIGN PATENT DOCUMENTS

DE      40 13 503     10/1991
DE      201 12 696    11/2001
(Continued)

OTHER PUBLICATIONS

Chinese Search Report dated Apr. 22, 2016 with respect to counterpart Chinese patent application 201380052678.8.
(Continued)

*Primary Examiner* — Jong-Suk (James) Lee
*Assistant Examiner* — Zheng Song
(74) *Attorney, Agent, or Firm* — Henry M. Feiereisen LLC

(57) ABSTRACT

An illumination device for the rear license plate of a motor vehicle includes a carrier wall bearing the license plate, to which a wall area forming a projection is connected, which projects rearwards above the license plate with an approximately horizontal surface. An aperture is located on the projection side and a switchable light source is located thereabove. The aperture is covered by a transparent lens, with an overlapping edge of the lens fastened from below to a contact edge surrounding the aperture. Light radiated by the light source through the lens is radiated through the surface inside the overlapping edge to the license plate. The lens has a light-guiding and/or light-deflecting element which is arranged such that light is also passed to at least a partial area of the rear overlapping edge of the lens and radiated at a predetermined luminance, to the license plate.

21 Claims, 5 Drawing Sheets

(51) Int. Cl.
*F21V 17/16* (2006.01)
*B60R 13/10* (2006.01)

(56) References Cited

U.S. PATENT DOCUMENTS

| | | | | |
|---|---|---|---|---|
| 5,791,772 | A * | 8/1998 | Rickfelder | F21V 5/045 362/329 |
| 6,109,771 | A * | 8/2000 | Konagaya | B60Q 1/56 29/563 |
| 2001/0001596 | A1* | 5/2001 | Goto | B60Q 1/56 362/520 |
| 2002/0018346 | A1 | 2/2002 | Andrea et al. | |
| 2003/0128548 | A1* | 7/2003 | Bowen | B60Q 1/56 362/497 |
| 2005/0094405 | A1* | 5/2005 | Tatewaki | B60Q 1/2696 362/341 |
| 2005/0286258 | A1 | 12/2005 | Katase | |
| 2006/0007689 | A1* | 1/2006 | Okabe | F21V 3/04 362/351 |
| 2009/0196059 | A1 | 8/2009 | Koizumi | |
| 2012/0120667 | A1* | 5/2012 | Schenkl | D06F 37/266 362/335 |

FOREIGN PATENT DOCUMENTS

| | | | |
|---|---|---|---|
| DE | 102 40 663 | 3/2004 | |
| DE | 202005014363 | 12/2005 | |
| DE | 102005028694 | 1/2006 | |
| DE | 202006009627 | 9/2006 | |
| DE | 102006018259 | 10/2007 | |
| DE | 102011016414 | 10/2012 | |
| EP | 0 587 501 | 3/1994 | |
| EP | 1920973 * | 5/2008 | ............... B60Q 1/56 |
| EP | 2 088 031 | 8/2009 | |
| FR | 2 887 506 | 12/2006 | |
| JP | 53-24727 | 3/1978 | |
| JP | 2000-168438 | 6/2000 | |
| JP | 3631824 * | 12/2004 | ............... B60Q 1/56 |
| JP | 2010-105426 | 5/2010 | |
| WO | WO 2005/005195 | 1/2005 | |
| WO | WO 2014/056607 A1 | 4/2014 | |

OTHER PUBLICATIONS

Translation of Chinese Search Report dated Apr. 22, 2016 with respect to counterpart Chinese patent application 201380052678.8.
International Search Report issued by the European Patent Office in International Application PCT/EP2013/003024 dated Dec. 10, 2013.

* cited by examiner

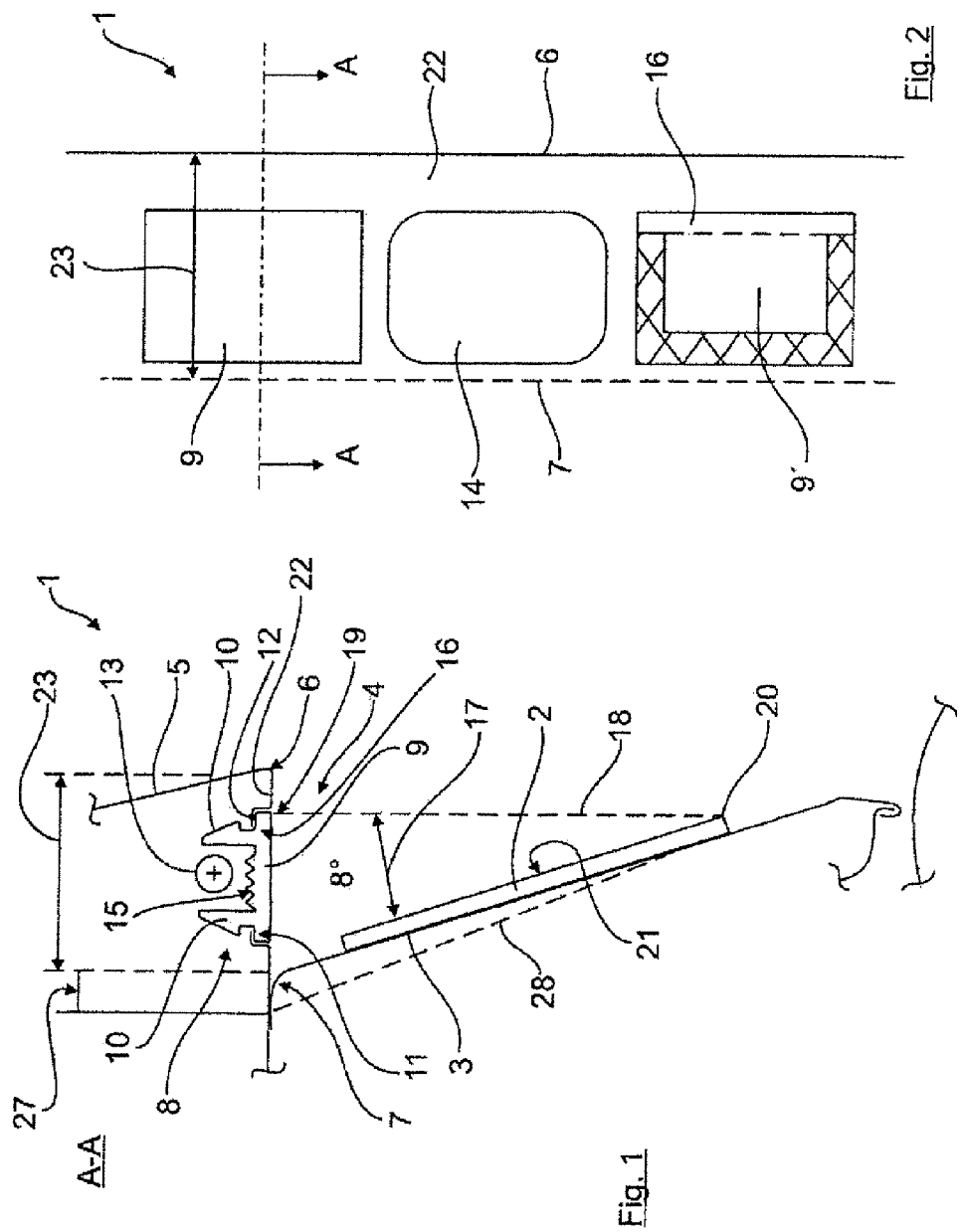

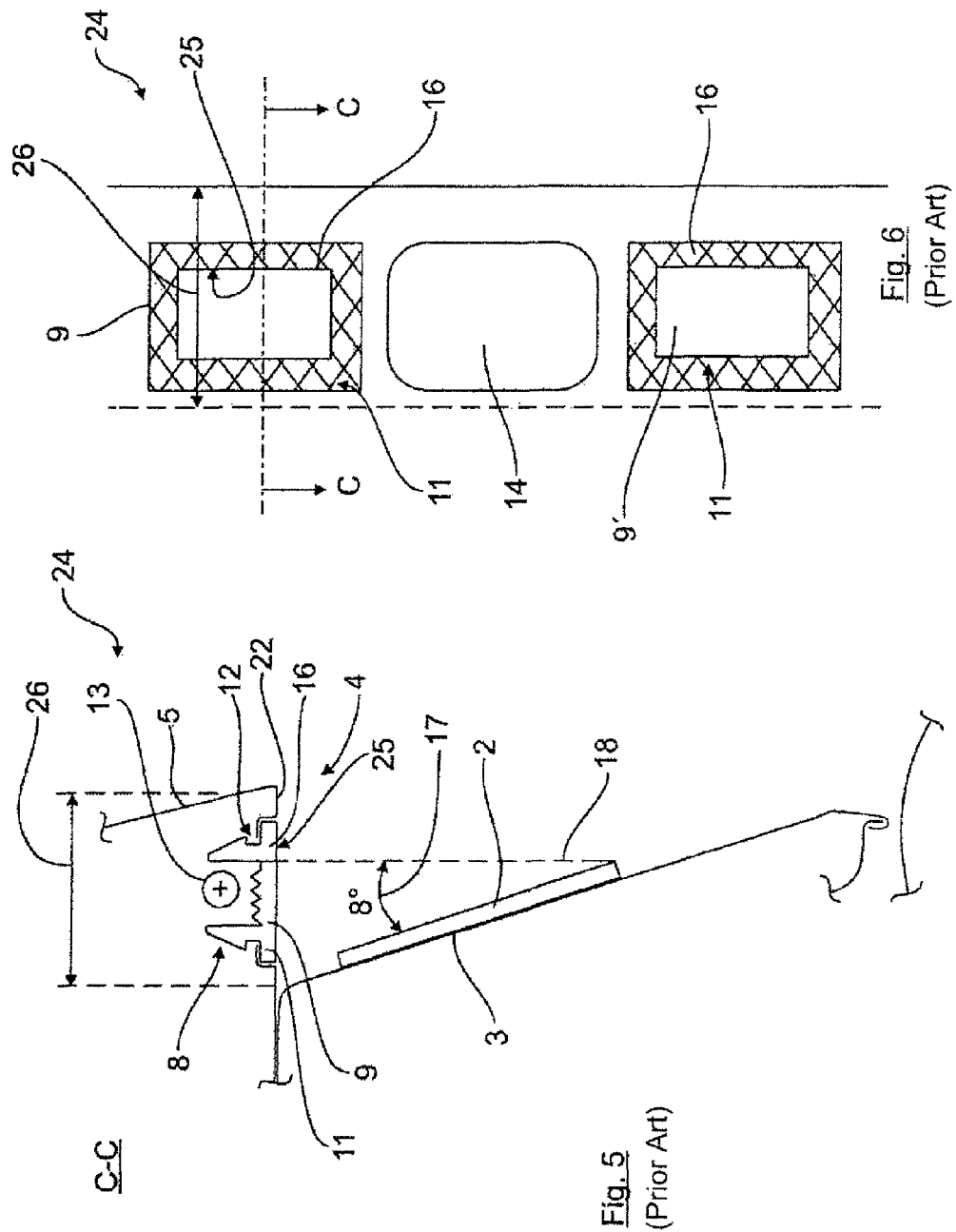

ILLUMINATION DEVICE FOR THE REAR LICENSE PLATE OF A MOTOR VEHICLE

CROSS-REFERENCES TO RELATED APPLICATIONS

This application is the U.S. National Stage of International Application No. PCT/EP2013/003024, filed Oct. 9, 2013, which designated the United States and has been published as International Publication No. WO 2014/056607 and which claims the priority of German Patent Application, Serial No. 10 2012 019 847.7, filed Oct. 10, 2012, pursuant to 35 U.S.C. 119(a)-(d).

BACKGROUND OF THE INVENTION

The invention relates an illumination device for the rear license plate of a motor vehicle.

Such generally known illumination device consists of a rear, body wall section as a carrier wall bearing the license plate and a wall section adjacent to the carrier wall as a projection projecting with an approximately horizontal surface rearward above the license plate. A body wall section forming a top wall abuts the projection in the upward direction.

At least one aperture with a switchable light source disposed above is provided in the projection, wherein the aperture is covered by a transparent lens. The lens covers with a peripheral overlapping edge a contact edge surrounding the aperture from below and is fastened in contact therewith. A pivoting attachment of the lens for mounting in the aperture is well known.

The projection is designed such that the contact edge of the aperture is opaque. Accordingly, the overlapping edge of the lens is not illuminated by the switched-on light source and is therefore so dark that it practically does not contribute to the illumination of the license plate.

The situation is similar when the "aperture" is formed by a downwardly open lamp housing, which is suitably covered by a lens from below, wherein the contact edge is then formed by the lamp housing. This case shall also be included in the term "aperture".

Detailed regulatory requirements exist for such an illumination device for the rear license plate of a vehicle, in particular with regard to the angle of incidence of the light and the luminance to be maintained by vehicle manufacturers (Official Journal of the European Union L/35 dated 31.01.2009, Rule No. 4 of the Economic Commission of the United Nations for Europe—uniform requirements concerning the approval of illumination devices for the rear license plate of motor vehicles and their trailers).

In particular, an angle of incidence of at least 8° on the license plate is required, with the result that this angle can only be met with the above generic illumination device, if the projection is relatively large and the license plate is installed in the rear at a depth of about 7 cm. The angle of 8° is usually closely maintained structurally, since a larger angle would lead to an even greater depth.

Such a relatively large projection interferes with the design and can also act as a dirt trap and potentially adversely affect the $c_w$ value.

DE 10 2006 018 259 A1 does not disclose a solution on the vehicle body, but merely discloses a license plate holder with integrated illumination formed as a separate component, which is then suitably installed on the vehicle body. In addition, this reference discloses explicitly that the light generated by the respective LED is directed by a reflector specifically onto a light guide bar, wherein the light is then coupled from the light guide bar to a limited coupling surface in the light guide bar. In conjunction with a second embodiment, it is described that a predetermined light exit surface should be formed on the surface of the light guide bar with an optical structure which directs light radiated by the LEDs towards the receiving plate. This optical structure is provided only in a central area of the light guide bar.

Furthermore, JP-A-2000168438 shows a structure in which the lamp housing is arranged completely inside a vehicle-body-side aperture.

DE 10 2005 028 694 A1 discloses a second reflector which serves only to direct the light emitted by an LED vertically downward in a manner illustrated therein in FIG. 8. A so-called diffusion step is provided as the only light-guiding or light-deflecting measure, which has the effect that light deflected downwardly by a first reflector is refracted again so that the upper partial area or upper edge portion of the license plate is illuminated.

DE 201 12 696 U1 only relates to a handle, in which a lighting fixture is integrated for license plate illumination. The light passes to the outside through a conventional window pane.

JP-A-2000 168 438 shows a structure in which in a vehicle-body-side aperture is provided in a horizontal body wall region directly above the license plate, through which a lamp protrudes from the inside to the outside in a technically unfavorable design. This lamp is sheathed by a U-shaped protective cover, wherein a light exit lens is provided at the bottom. U.S. 2009/019 60 59 A1 discloses a similar structure, having an aperture disposed in a cover through which light can be radiated onto the license plate. A diffusion lens is also provided which is arranged with spacing above the lens and which scatters the light downwards.

DE 40 13 503 A1 also relates to a completely different conceptual structure than described above. In fact, a housing projects here in the region of a projection downwards in the direction of the license plate, wherein a lens is inserted in the downward-projecting part. The design of such a structure is technically disadvantageous, causes unwanted high-frequency noise, and can act as a dirt trap.

DE 102 40 663 A1 also relates only to a license plate holder as such, in which LEDs are integrated in the edge.

DE 20 2005 014 363 U1 has a structure in which a lamp housing is clipped in a body-side projection and in the aperture formed therein. This lamp housing carries a light exit lens, above which an optical element is arranged directly below a lighting means that is intended to refract and scatter the light so that the entire license plate is illuminated.

DE 20 2006 009 627 U1 shows in FIG. 2 that a rear optical structure should be formed so that the light coming from an LED is deflected only vertically downwards.

SUMMARY OF THE INVENTION

It is therefore an object of the invention to improve a generic illumination device so that the depth of the projection is reduced in compliance with the regulatory requirements for the angle of incidence of the light.

According to one aspect of the invention, an illumination device for a rear license plate of a vehicle is provided, which has a body wall section as a carrier wall bearing the license plate, followed by a body wall section forming a projection which projects toward the rear in the vehicle's vertical axis direction above the license plate with an approximately horizontal surface. Furthermore, at least one aperture with a switchable light source is provided on the side of the projection, wherein the aperture is covered by a transparent lens such that the lens covers and is attached in direct contact with a contact edge surrounding the aperture with an overlapping edge from below. Light radiated from the light source through the lens is hereby transmitted to the license plate with predetermined luminance through the area inside the overlapping edge. According to the invention, the lens has at least one light-guiding and/or light-deflecting element which is arranged and/or designed so as to direct light also to at least one partial region of the rear overlapping edge of the lens, from where the light is then also radiated with predetermined luminance toward the license plate.

This measure ensures that the rear or rearmost overlapping edge of the lens radiates light and can thus be used in the measurement of the required angle of incidence of the light, so that the projection depth can advantageously be reduced.

According to a particularly preferred specific embodiment, it is proposed to form the at least one light-guiding and/or light-deflecting element from at least one light scattering structure applied to and/or attached to at least one surface of the lens and/or integrated into the material of the lens, in particular by at least one prismatic structure, with which the light can be deflected laterally to at least one partial area of the rear overlapping edge, from which the light can then be radiated toward the license plate. The regulatory requirements for the luminance must hereby be considered.

To determine the required angle of incidence, it is evidently sufficient when the light-guiding and/or light-deflecting measures only cause illumination of the rear overlapping edge or a portion of the rear overlapping edge. The regulatory requirements for the luminance must be considered also for the rear overlapping edge.

Moreover, the rear overlapping edge, preferably an overlapping edge that is substantially straight and/or extends in the vehicle's transverse direction, has at least one projection projecting from this overlapping edge like a finger rearward in the direction of travel, into which projection light is introduced and from which projection light having a predetermined luminance can be radiated to the license plate. Such solution in form of a finger can be implemented easily and with little effort, for example, by extending the rear overlapping edge in at least one defined area, for example, in the central region, rearward in the direction of travel (wherein likewise, for example, a aperture receiving the projection is provided on the side of the contact edge), so that this projection or its edge facing rearward in the direction of travel then forms the reference point for determining the angle of incidence. Overall, the overlap depth can be reduced in a particularly simple and/or inexpensive manner.

In another particularly preferred embodiment, the at least one light-guiding and/or light-deflecting element is constructed and/or arranged so that the light is introduced into the entire rear overlapping edge together with the at least one projection. Alternatively, however, the light may only be introduced into the region of the rear overlapping edge associated with the at least one projection. Such variations thus advantageously enhance the design flexibility in the actual planning and implementation of the illumination device according to the invention.

According to a particularly preferred embodiment, in order to reduce the projection depth as much as possible, a rear or rearmost edge of the rear overlapping edge in relation to the travel direction, preferably a finger-shaped projection of the rear overlapping edge, is directly adjacent to and/or is covered by a transitional edge from the projection to a wall section (upper wall) in the vehicle's vertical axis direction. In other words, the rear edge of the projection or of the rear overlapping edge is set back sufficiently far so that the rear edge is only minimally covered by a rear edge of the projection and is thus not visible from the rear in a normal observer position where the observer is standing.

In an advantageous embodiment for particularly favorable light deflection and radiation, at least one light-guiding and/or light-deflecting element is associated with the rear overlapping edge and/or the at least one finger-shaped projection, with which the light introduced into the rear overlapping edge is radiated toward the license plate. Advantageously, the light is radiated as directed and/or diffused light.

In particular, in a technically particularly advantageous structural design, the angle (angle of incidence) between a straight connecting line from a rear edge in the travel direction of the light-emitting rear overlapping edge to the bottom edge of the license plate and a visible surface of the license plate is at least 8°, preferably exactly 8°. The distance between a rear edge formed between the carrier wall and the projection and the lens as well as the distance between the rear edge of the rear overlapping edge and the transitional edge of the projection to an upper wall connected upward to the projection in the vehicle's vertical axis should be designed to be as small as constructively possible to minimize the depth of the projection. Inclusion of the light-radiating rear overlapping edge according to the invention in the measurement of the 8° angle and minimization of the above-mentioned distance allow an advantageous reduction of the depth of the projection, which allows in particular better design solutions.

Specifically, the rear overlapping edge and/or the at least one light-guiding and/or light-deflecting structure may be constructed such that light is radiated from a rear edge of the rear overlapping edge in relation to the driving direction downward toward the license plate, in particular such that the rear edge forms the reference point for determining the angle of incidence.

In a particularly simple and functionally reliable and technically advantageous embodiment, the light-guiding and/or light-deflecting structure associated with the rear overlapping edge is formed by a light-reflecting element, for example an element constructed by reflective coating. Specifically, the light-guiding and/or light-deflecting structure associated with the rear overlapping edge may for this purpose be arranged in the area between the rear overlapping edge and the contact edge associated therewith and/or may be applied at this location to the rear overlapping edge.

Technically advantageous is also a design, wherein the contact edge of the aperture with which the rear overlapping edge, preferably a rear overlapping edge in conjunction with at least one finger-shaped projection is in contact, is set back by the lens thickness such as to form a flat, lower projection wall section.

Common fasteners or retaining elements are available to the skilled artisan for attaching the lens. In a simple embodiment, clips for mounting in the aperture may be integrally formed on the lens.

Commonly used illumination means are available to the skilled artisan as a light source, preferably incandescent bulbs or LEDs.

The illumination device may, for example, be part of a vehicle door, in particular a tailgate or trunk lid of a vehicle, or may be part of a bumper, depending on where the license plate is attached and arranged.

Furthermore, the wall areas bearing the illumination device and/or the license plate may be made of a plastic material and/or of sheet metal. When the projection and the upper wall and the carrier wall are formed, for example, from stamped metal sheets, a distance between the rear aperture edge and the transitional edge is required for the joining process in production as a hold-down projection. This distance can be eliminated especially with plastic parts, although it must be taken into consideration here too that light-radiating illumination parts should be covered in such a way that they are not directly visible from the rear side of the vehicle.

BRIEF DESCRIPTION OF THE DRAWING

Embodiments of the invention will now be explained in more detail with reference to a drawing, which shows in:

FIG. 1 a schematic cross-sectional view of a illumination device for the rear license plate of a motor vehicle according to a first embodiment.

FIG. 2 a view from below of the illumination device of FIG. 1 in two alternative embodiments, FIG. 3 a schematic cross-section of an illumination device according to a second embodiment, FIG. 3a an enlarged view of the detail Z of FIG. 3, FIG. 4 a view from below of the embodiment of FIG. 3 with two alternative modifications, FIG. 5 a schematic cross-section on an illumination device according to the prior art, and FIG. 6 a view from below of the illumination device of FIG. 5.

DETAILED DESCRIPTION OF PREFERRED EMBODIMENTS.

Figure 1A:
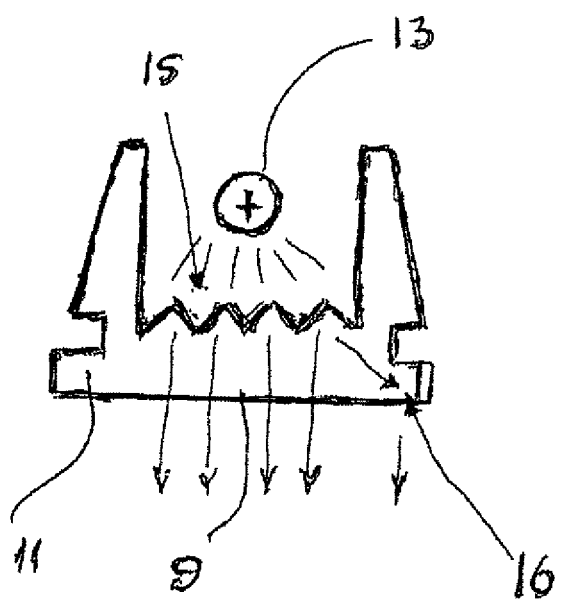
FIG. 1a is an enlarged view of a transparent lens of the illumination device of FIG. 1.

FIG. 1 is a schematic vertical cross-section in the vehicle's longitudinal direction of an exemplary embodiment of an illumination device 1 according to the invention for the rear license plate 2 of a motor vehicle. The body wall region bearing the license plate as a carrier wall 3 and a wall section abutting the carrier wall 3 are illustrated as a projection 4, which is adjoined by an upwardly oriented body wall region as an upper wall 5. The projection 4 projects rearward above the license plate 2 with an approximately horizontal surface and transitions with a transitional edge 6 into the top wall 5. Only shown as an example, the carrier wall 3 is bent rearward at an angle at the contact edge 7 where the projection 4 projects rearward.

As is evident from the cross-section of FIG. 1, an aperture 8 is disposed in the wall region of the projection 4, into which a transparent lens 9 is inserted from below and retained by snap elements 10. The lens 9 contacts here the contact edge 12 that surrounds the aperture 8 from below with a circumferential overlapping edge 11. In addition, a switchable light source 13 embodied as a light bulb of an unillustrated lamp is shown schematically above the lens 9.

As is evident from the top view of the illumination device 1 seen from below, two rectangular lenses 9, 9' that are spaced apart in the longitudinal direction of the license plate 2 are provided, between which a (schematically indicated) exemplary handle 14 for unlocking a tailgate is arranged, which can of course only be the case when the illumination device 1 together with a license plate 2 is disposed on a tailgate. It will be appreciated that the illumination device together with the license plate can of course be arranged at any suitable location, for example also in the bumper region of a vehicle.

According to the invention, the lens 9, 9' includes light-guiding and/or light-deflecting elements—in the present example prismatic structures 15 molded on the inner lens surface—which are formed and/or arranged such that light radiated from the light source 13 through the lens 9, 9' is radiated not only through the area inside the overlapping edge 11 to the license plate 2 with a predetermined luminance —at least 2.5 cd/m$^2$, but that light is also guided into the overlapping edge 11 or at least into the rear overlapping edge 16 of the lens 9, 9', from where the light is then also radiated with the aforementioned luminance toward the license plate 2.

FIG. 2 illustrates a situation of the (in relation to the image plane) upper lens 9, where the light is deflected by the light-guiding and/or light-deflecting elements such that the entire circumferential overlapping edge 11 of the lens 9 radiates light with sufficient luminance onto the license plate 2. The (lower) lens 9' represents the situation where only the rear overlapping edge 16, which is a straight line extending in the vehicle transverse direction, has sufficient light emission with the required light deflection (the areas of the overlapping edge 11 having no or insufficient light emission are crosshatched for better differentiation). With both afore-described options, the regulatory requirement for an angle of incidence 17 of 8° can be maintained. This angle of incidence 17 is measured according to FIG. 1 between a straight connecting line 18 from a rear edge 19 of the light-emitting rear overlapping edge 16 to the lower edge 20 of the license plate 2 and the visible surface 21 of the license plate 2.

The projection 4 and the top wall 5 and the carrier wall 3 can be made of any material, for example of plastic or sheet metal. For ease of manufacturing, it may sometimes be necessary, for example when using sheet metal, to include a spacing 22 between the rear aperture edge or the rear edge 19 of the rear overlapping edge 16 and the transitional edge 6, for example as hold-down projection for the joining process. In order to maintain the required minimum angle of incidence of 8°, at least the illustrated projection depth 23 is thus required by also taking into account the spacing 22.

FIGS. 5 and 6 shows a similar illumination device 24 according to the prior art for explaining the differences with the embodiment according to the invention illustrated in FIGS. 1 and 2, wherein identical elements are identified by the same reference symbols. The carrier wall 3 holding the license plate 2, the projection 4 and the top wall 5 as well as the light source 13 and the lens 9 can also be seen in FIGS. 5 and 6. Like in in FIGS. 1 and 2, the lens 9 rests here with the circumferential overlapping edge 11 on the set-back, opaque contact edge 12 of the projection 4 or the aperture 8. Since no light-guiding elements for lateral deflection of light, in particular no prism structures 15, are provided, the circumferential overlapping edge 11 of the lens 9 as well as the rear overlapping edge 16 are not illuminated and hence dark, or are not illuminated with luminance sufficient for license plate illumination, as shown by cross-hatching in FIG. 6. Thus, the straight connecting line 18 relevant for determining the minimum angle of incidence of 8° can only connect to the front, still illuminated edge 25 of the rear overlapping edge 16. To maintain the angle of incidence 17 of 8°, the carrier wall 3 must be shifted sufficiently forward in the vehicle's longitudinal direction, as is shown for comparison by the dashed line 28 in FIG. 1. In the prior art shown in FIG. 5 and FIG. 6, the minimum angle of incidence 27 can thus be maintained only with a comparatively large projection depth 26, which is greater by the projection amount 27 than the projection depth 23 of the embodiment according to the invention shown in FIGS. 1 and 2.

Figure 3A:
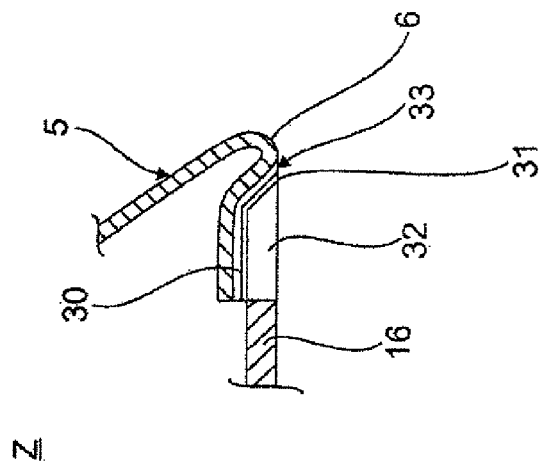
Figure 3:
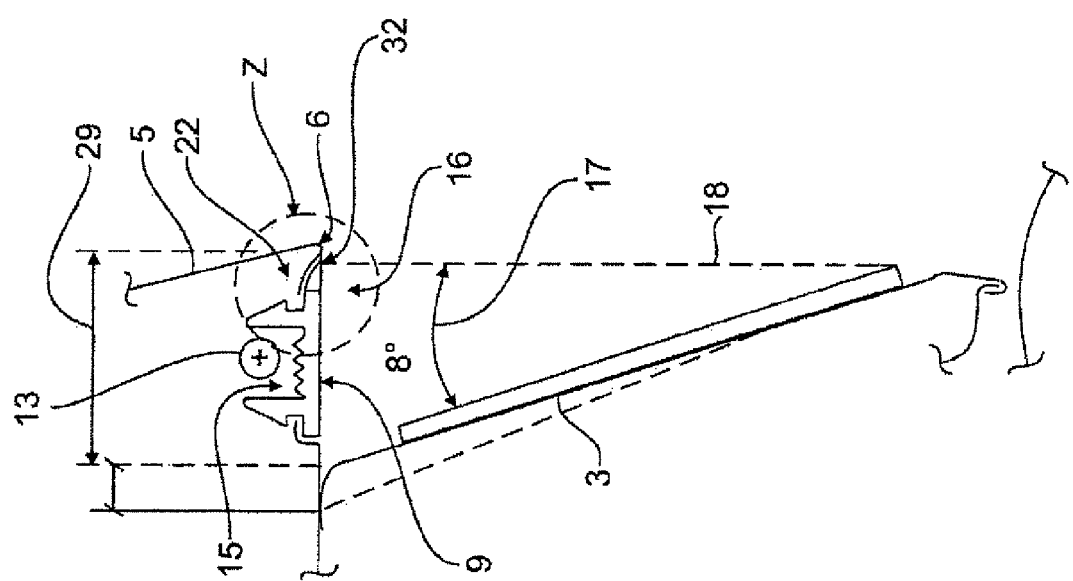
Figure 4:
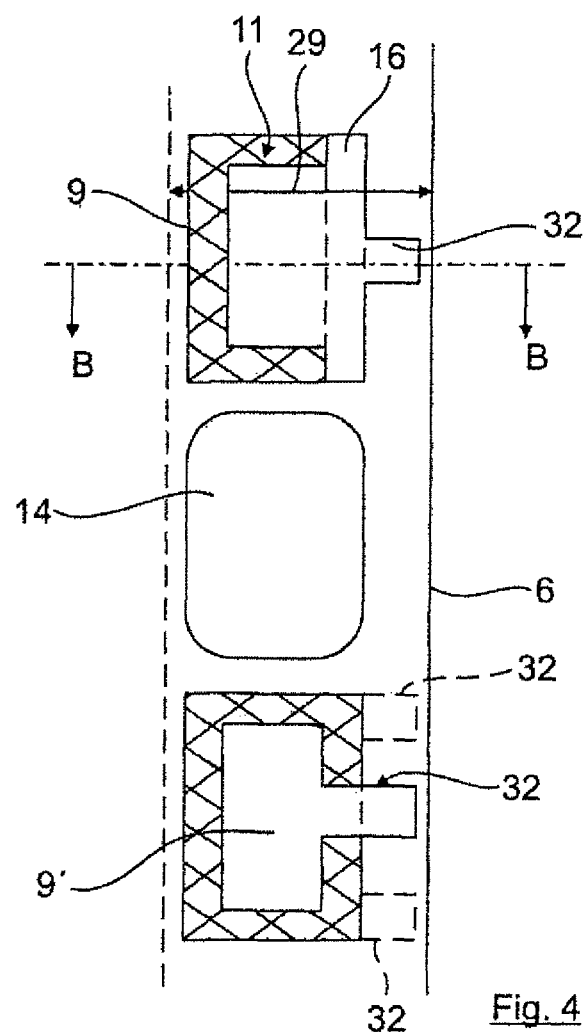

In another particularly preferred embodiment according to FIGS. 3 and 4, the projection depth 29 may optionally be further reduced compared to the projection depth 26 according to the prior art and the projection depth 23 of the first embodiment:

For this purpose, the rear, here substantially straight overlapping edge 16 extending in the vehicle's transverse direction, here in another example in a central region as viewed in the vehicle's transverse direction, has a finger-shaped projection 32 projecting rearward in relation to the direction of travel, into which light is introduced and from which light having a predetermined luminance for license plate 2 is radiated. Optionally, of course, a plurality of projections 32 that are spaced-apart in the transverse direction may also be provided, for example, two or more projections, as symbolically illustrated in FIG. 4 by dashed lines. Likewise, when several projections 32 are present, these can be formed identically or differently.

As seen from the enlarged detail view Z of FIG. 3a, an aperture 33 receiving the projection 32 is provided in the region of the transitional edge 6 on the side of the contact edge, in which the projection 33 is received preferably with a matching contour, with this projection 32 or its rear edge 31 in relation to the travel direction forming the reference point for determining of the angle of incidence.

As illustrated in the lower half of FIG. 4 in form of an example, the light can only be introduced into the region of the rear overlapping edge 16 associated with the projection 32 and into the projection 32. Alternatively, the light could also be introduced into the entire rear overlapping edge, which is shown in the upper half of FIG. 4.

As clearly visible particularly from the FIG. 3a, the (in relation to the direction of travel) rear edge 31 of the projection 32 of the rear overlapping edge 16 directly abuts the transitional edge 6 (for example, a fold), which also covers the projection 32 from the rear. This means that the rear edge 31 of the projection 32 is moved here so far rearward that the rear edge 31 is only minimally covered by the transitional edge 6 of the projection 4 and hence is not visible for an observer assuming a normal standing position.

The rear overlapping edge 16 or only a portion thereof, and/or the projection 32 are preferably provided with, for example, a reflective coating as a light-guiding and/or light-deflecting element 30, with which the light introduced into the rear overlapping edge 16 and then further into the projection 32 can be radiated toward the license plate 2 with yet further improved directionality.

It is thus evident that the carrier wall 3 bearing the license plate 2 can be moved farther toward the rear and the projection depth 29 can be further reduced while maintaining the predetermined angle of incidence, in particular an angle of incidence of 8°.

The invention claimed is:

1. An illumination device for a rear license plate of a motor vehicle, comprising:
   a first body wall section constructed as a carrier wall bearing the license plate,
   a second body wall section forming a projection and abutting the first body wall section, with the second body wall section arranged above the license plate in a vehicle's vertical axis direction and projecting rearward with a substantially horizontal surface,
   at least one aperture disposed on a side of the projection and having a contact edge surrounding the aperture,
   a switchable light source disposed above the at least one aperture, and
   a transparent lens having a straight horizontal portion extending in a horizontal direction and covering the aperture, with an overlapping edge of the transparent lens covering and being affixed from below to the contact edge in direct contact, wherein light emitted from the switchable light source is radiated downwardly through the lens with a predetermined luminance through an area inside the overlapping edge toward the license plate, said lens including integrally formed retaining elements extending vertically from a horizontal portion of the lens for detachable retention of the lens in the aperture,
   wherein the transparent lens comprises at least one light-guiding or light-deflecting element directly formed on the straight horizontal portion of the transparent lens, extending upwardly from the straight horizontal portion of the transparent lens and arranged or constructed such that light emitted from the switchable light source is not only radiated downwardly through the lens with the predetermined luminance through the area inside the overlapping edge toward the license plate, but is also directed by the at least one light-guiding or light-deflecting element directly formed on the straight horizontal portion of the transparent lens and extending upwardly from the horizontal portion of the transparent lens into at least a portion of a rear overlapping edge of the lens and radiated from the at least the portion of the rear overlapping edge toward the license plate with the predetermined luminance,
   wherein the rear overlapping edge comprises a plurality of spaced-apart finger-shaped projections projecting in a transverse direction rearward with respect to a direction of travel, wherein the plurality of spaced-apart finger-shaped projections including a reflective coating to radiate incident light with the predetermined luminance toward the license plate.

2. The illumination device of claim 1, wherein the at least one light-guiding or light-deflecting element is formed by at least one light-scattering structure directly formed on and extending upwardly from the straight horizontal portion of the transparent lens and configured to laterally deflect light to at least one portion of the rear overlapping edge, from which the deflected light is then radiated toward the license plate.

3. The illumination device of claim 2, wherein the at least one light-scattering structure is formed on or attached to a surface of the lens or integrated into the material of the lens, or a combination thereof.

4. The illumination device of claim 2, wherein the at least one light-scattering structure is a prismatic structure.

5. The illumination device of claim 1, wherein the rear overlapping edge extends substantially in a straight line or in a transverse direction of the vehicle.

6. The illumination device of claim 1, wherein the at least one light-guiding or light-deflecting element is constructed or arranged such that the light is introduced into the entire rear overlapping edge including the plurality of spaced-apart finger-shaped projections.

7. The illumination device of claim 1, wherein the at least one light-guiding or light-deflecting element is constructed or arranged such that the light is introduced only into an area of the rear overlapping edge that is associated with the plurality of spaced-apart finger-shaped projections.

8. The illumination device of claim 1, wherein a rear or a rearmost edge of the rear overlapping edge abuts directly or is covered by a transitional edge extending from the plurality of spaced-apart finger-shaped projections to an upper wall section that abuts upwardly in a vehicle's vertical axis direction.

9. The illumination device of the claim 1, wherein the at least one light-guiding or light-deflecting element is associated with the rear overlapping edge or the plurality of spaced-apart finger-shaped projections, wherein the at least one light-guiding or light-deflecting element is configured to radiate the light introduced into the rear overlapping edge toward the license plate as directed or diffuse light.

10. The illumination device claim 1, wherein the angle of incidence between a connecting straight line extending from a rear edge of the rear overlapping edge in relation to a driving direction to a lower edge of the license plate and a visible surface of the license plate is at least 8°.

11. The illumination device claim 10, wherein the angle of incidence is exactly 8°.

12. The illumination device of claim 1, wherein the rear overlapping edge or the at least one light-guiding or light-deflecting element is formed such that light from a rear edge of the rear overlapping edge is radiated downward toward the license plate.

13. The illumination device of claim 12, wherein the rear overlapping edge forms a reference point for determining the angle of incidence.

14. The illumination device of claim 12, wherein the light-guiding or light-deflecting element associated with the rear overlapping edge is formed by a light-reflecting element.

15. The illumination device of claim 14, wherein the light-reflecting element comprises a reflective coating.

16. The illumination device of claim 12, wherein the light-guiding or light-deflecting structure is arranged in a region between the rear overlapping edge and the contact edge or is applied on the rear overlapping edge.

17. The illumination device of claim 1, wherein the contact edge in contact with the rear overlapping edge is set back by a thickness of the lens so as to create a flat, lower projection wall region.

18. The illumination device of claim 1, wherein the retaining elements are clips.

19. The illumination device of claim 1, wherein the switchable light source comprises an incandescent lamp or an LED.

20. The illumination device of claim 1, wherein the illumination device is part of a vehicle component selected from the group consisting of a vehicle door, a tailgate, a trunk lid and a bumper.

21. The illumination device of claim 1, wherein the first body or the second body wall sections bearing the illumination device or the license plate are made of plastic or metal sheet.

* * * * *